United States Patent [19]

Yavis

[11] 4,235,017
[45] Nov. 25, 1980

[54] SABER SAW ATTACHMENT

[76] Inventor: Harry Yavis, 438 N. Willett, Memphis, Tenn. 38112

[21] Appl. No.: 67,184

[22] Filed: Aug. 16, 1979

[51] Int. Cl.³ .................. B27B 11/00; B27G 23/00
[52] U.S. Cl. ................................. 30/377; 30/392
[58] Field of Search .............. 30/373, 374, 375, 377, 30/392, 393, 394

[56] References Cited

U.S. PATENT DOCUMENTS

| 2,705,980 | 4/1955 | Papworth | 30/393 |
| 3,388,728 | 6/1968 | Riley | 30/392 |
| 3,572,409 | 3/1971 | Hoffman | 30/392 X |
| 3,750,483 | 8/1973 | Burrows | 30/392 X |

Primary Examiner—Jimmy C. Peters
Attorney, Agent, or Firm—Walker & McKenzie

[57] ABSTRACT

An attachment for a typical saber saw to allow the depth of cut of the saber saw to be varied. The attachment includes a parallelogram-type member for attachment to the underside of the base plate of the saber saw and an adjustment member for varying the overall thickness or height of the parallelogram-type member whereby the depth of cut of the saber saw is effectively varied.

5 Claims, 5 Drawing Figures

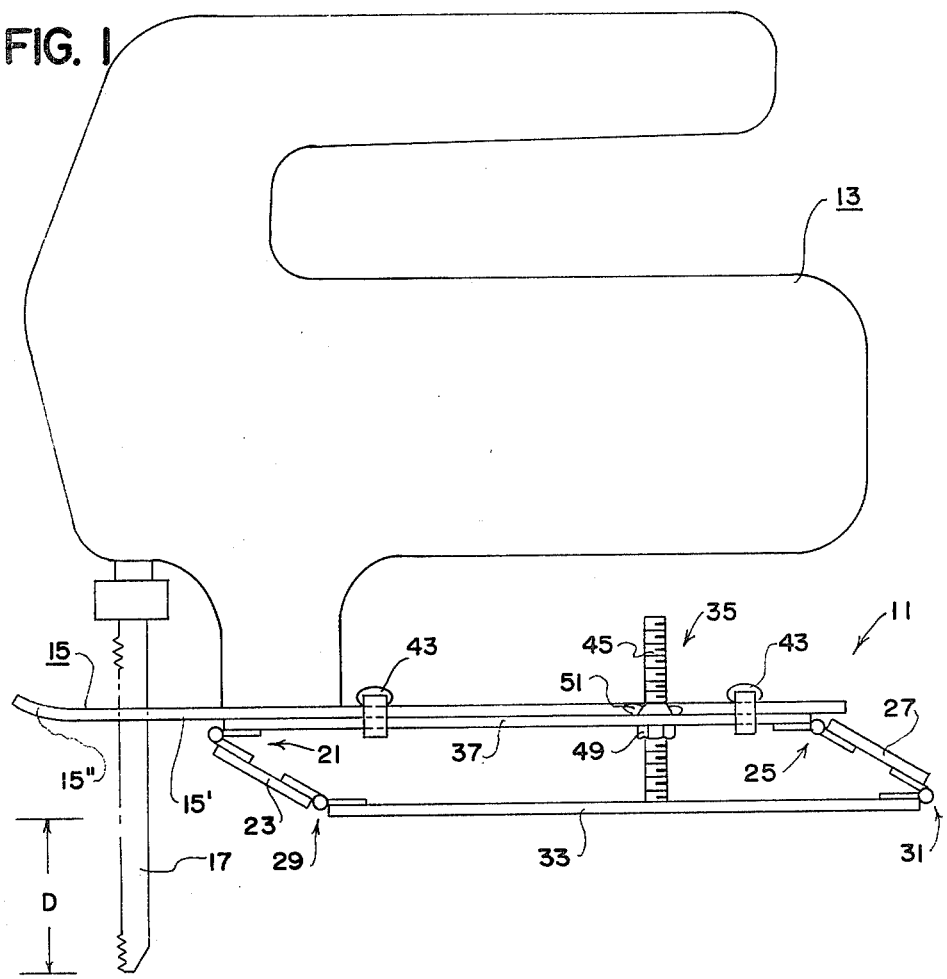
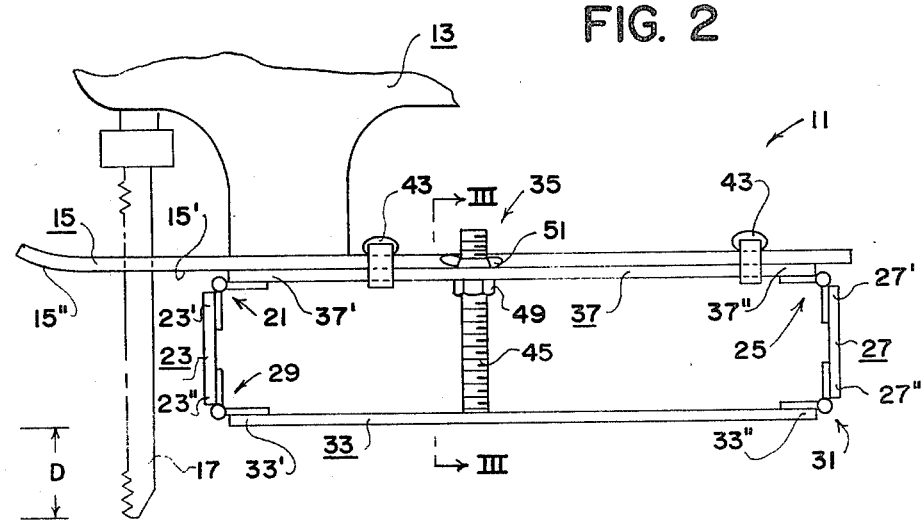

SABER SAW ATTACHMENT

BACKGROUND OF THE INVENTION

1. Field of the Invention

This invention relates in general to attachment means for being attached to saber saws and more specifically to such an attachment means for controlling the depth of cut of a saber saw.

2. Description of the Prior Art

Saber saws consist of portable machine saws that include, in general, a base plate having a substantially flat underneath side for normally engaging the material to be cut, and a narrow reciprocating cutting blade extending to a depth lower than the base plate. The depth of cut of the cutting blade is in general not adjustable. The normal practice when it is desired to vary the depth of cut such a saber saw has been to merely break or cut off a portion of the cutting blade so that it is made shorter to make the maximum distance that the cutting blade extends below the base plate less thereby controlling to an extent the depth of cut of the saber saw.

The following patents may be of interest to persons wishing to make and use the present invention. Metzger, U.S. Pat. No. 1,253,705; Laserson, U.S. Pat. No. 1,352,519; Harrington, U.S. Pat. No. 2,352,432; and Treleaven, U.S. Pat. No. 4,023,273. None of the above patents disclose or suggest the present invention.

SUMMARY OF THE PRESENT INVENTION

The saber saw attachment means of the present invention is directed towards providing a safe, fast and effective means for adjusting the depth of cut of a saber saw. The concept of the present invention is to attach an adjustable parallelogram-type means to the underneath side of the base plate of the saber saw to allow, in effect, the thickness of the base plate to be varied to thereby control the depth of cut of the cutting blade of the saber saw.

The attachment means of the present invention comprises, in general, a first pivot means for being attached to the underneath side of a base plate of a saber saw; a first arm means for being attached to the first pivot means and for pivotal movement relative to the base plate, the first arm means having a first end attached to the first pivot means and having a second end; a second pivot means for being attached to the underneath side of the base plate at a spaced distance from the first pivot means; a second arm means for being attached to the second pivot means and for pivotal movement relative to the base plate, the second arm means having a first end attached to the second pivot means and having a second end; a third pivot means for being attached to the second end of the first arm means; a fourth pivot means for being attached to the second end of the second arm means; a first plate means for engaging the material to be cut when the attachment means is attached to a saber saw, the first plate means having a first end for being attached to the third pivot means and having a second end for being attached to the fourth pivot means; and an adjustment means for causing the first plate means to be spaced a variable distance below the underneath side of the base plate and for allowing the depth of cut of the saber saw to be varied.

BRIEF DESCRIPTION OF THE DRAWINGS

FIG. 1 is a side elevational view of the attachment means of the present invention shown attached to a saber saw.

FIG. 2 is a side elevational view similar to FIG. 1 but with the attachment means of the present invention in a moved position and with portions of the saber saw broken away for clarity.

DESCRIPTION OF THE PREFERRED EMBODIMENT

Figure 3:
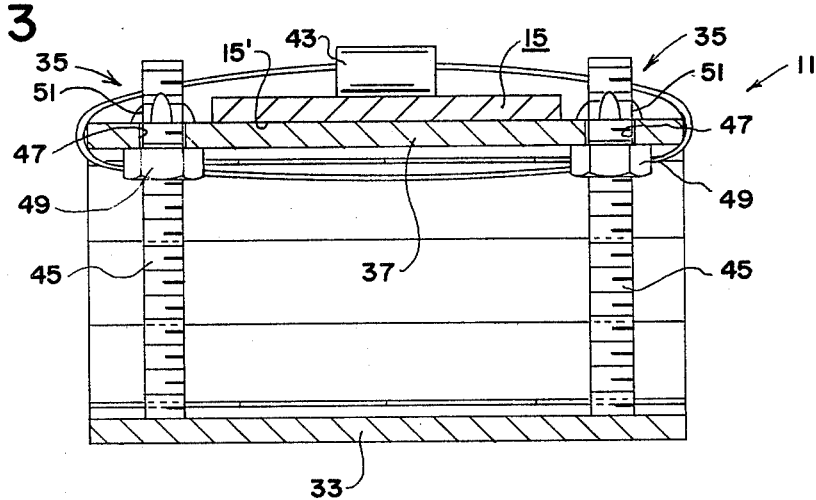
FIG. 3 is a sectional view as taken on line III—III of FIG. 2.

The attachment means 11 of the present invention is for controlling the depth of cut of a saber saw 13 of the type including a base plate 15 having an underneath side 15' for normally engaging material such as wood to be cut. The saber saw 13 includes a cutting blade 17 for reciprocating movement relative to the base plate 15. More specifically, the base plate 15 preferably includes an upturned forward end 15" having a slot 19 therein through which the blade 17 passes. The attachment means 11 includes a first pivot means 21 for being attached to the underneath side 15' of the base plate 15, a first arm means 23 having a first end 23' for being attached to the first pivot means 21 and for pivotal movement relative to the base plate 15 and having a second end 23", a second pivot means 25 for being attached to the underneath side 15' of the base plate 15 at a spaced distance from the first pivot means 21, a second arm means 27 having a first end 27' for being attached to the second pivot means 25 and for pivotal movement relative to the base plate 15 and having a second end 27", a third pivot means 29 for being attached to the second end 23" of the first arm means 23, a fourth pivot means 31 for being attached to the second end 27" of the second arm means 27, a first plate means 33 having a first end 33' for being attached to the third pivot means 29 and having a second end 33" for being attached to the fourth pivot means 31, and an adjustment means 35 for causing the first plate means 33 to be spaced a variable distance below the underneath side 15' of the base plate 15 and for allowing the depth of cut of the saber saw 13 to be varied.

Figure 5:
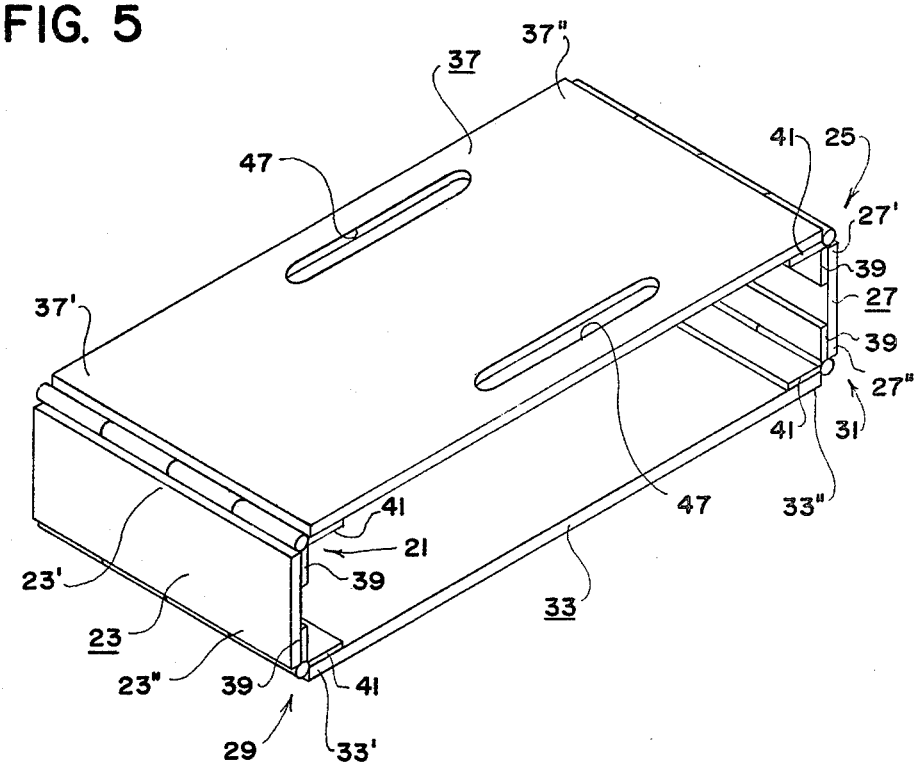
FIG. 5 is a pictorial view of a portion of the attachment means of the present invention.

The attachment means 11 preferably includes a second plate means 37 having a first end 37' for being attached to the first pivot means 21 and having a second end 37" for being attached to the second pivot means 25. The pivot means, arm means, and plate means coact with one another to form a parallelogram-type structure as shown in FIG. 5. The pivot means 21, 25, 29, 31 may each consist simply of a typical piano-type hinge member or the like. Thus, each pivot means 21, 25, 29, 31 includes a first leaf 39 and a second leaf 41 hingeably joined one to the other by way of a pin or the like (not shown) as will be apparent to those skilled in the art. Thus, for example, the first leaf 39 of the first pivot means 21 may be fixedly attached to the first end 23' of the first arm means 23 in any manner apparent to those skilled in the art such as by welding. Likewise, the second leaf 41 of the first pivot means 21 may be fixedly attached to the first end 37' of the second plate member 37 in any manner apparent to those skilled in the art such as by welding. Likewise, the first leaf 39 of the second pivot means 25 may be fixedly attached to the first end 27' of the second arm means 27 and the second leaf 41 of the second pivot means 25 may be fixedly attached to the second end 37" of the second plate means 37. The first leaf 39 of the third pivot means 29 may be fixedly attached to the second end 23" of the first arm means 23 and the second leaf 41 of the third pivot means 29 may be fixedly attached to the first end 33' of the first plate means 33. The first leaf 39 of the fourth pivot means 31 may be fixedly attached to the second end 27" of the second arm means 27 and the second leaf 41 of the fourth pivot means 31 may be fixedly attached to the second end 33" of the first plate means 33. The arm means 23, 27 and plate means 33, 37 may be constructed of any substantially rigid material apparent to those skilled in the art such as sheet metal.

The first and second pivot means 21, 25 may be attached to the underneath side 15' of the base plate 15 in any manner apparent to those skilled in the art. For example, clamp means 43 may be provided to clamp the second plate means 37 to the underneath side 15' of the base plate 15 thereby in effect attaching the first and second pivot means 21, 25 to the underneath side 15' of the base plate 15. The clamp means 43 may consist simply of a pair of adjustable radiator hose-type clamp members well known to those skilled in the art that can be easily adjusted by means of a screwdriver or the like for extending about the base plate 15 and the second plate means 37. Further, description of the clamp means 43 is deemed not necessary.

Figure 4:
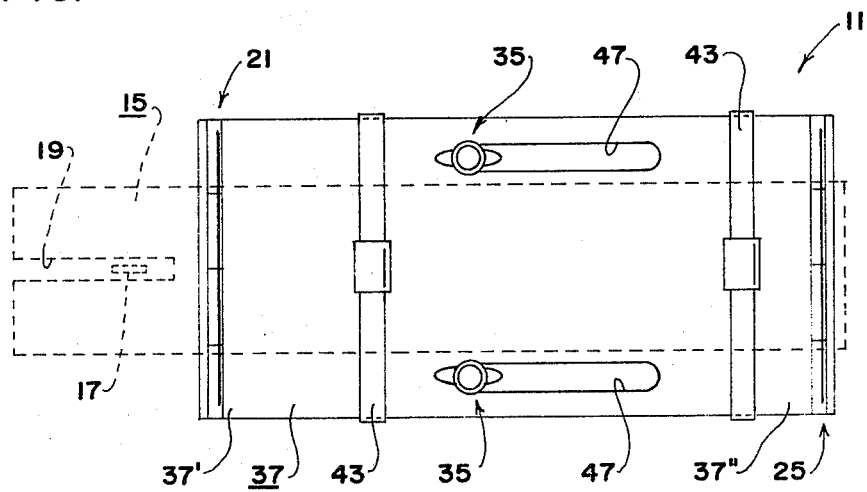
FIG. 4 is a somewhat diagrammatic top plan view of the attachment means of the present invention with portions of the saber saw shown thereon in broken lines.

The attachment means 11 preferably includes a pair of adjustment means 35 for positioning on either side of the base plate 15 as clearly shown in FIGS. 3 and 4. Each adjustment means 35 preferably includes a threaded bolt member 45 for extending through a slot 47 in the second plate means 37 and for abuttingly engaging the first plate means 33 when the saber saw 13 is engaging the material to be cut (see FIGS. 1 and 2). Each adjustment means 35 also preferably includes a lower or adjustment nut member 49 threadingly positioned on the bolt member 45 beneath the second plate means 37 and an upper or lock nut member 51 threadingly positioned on the bolt member 45 above the second plate means 37. The nut members 49, 51 coact with the bolt member 45 and the second member 37 to lock the bolt member 45 to the second plate means 37 with any desired length of the bolt member 45 extending below the second plate means 37.

To vary the depth of cut of the saber saw 13, the upper nut member 51 is merely loosened from the second plate means 37 to allow the lower nut member 49 to then be turned on the bolt member 45 so that a greater or lesser length of the bolt member 45 extends below the second plate means 37. The upper nut member 51 is then retightened to thereby lock the bolt member 45 in that position. It should be noted that the depth of cut of a typical saber saw 13 is the distance between the underneath side 15' of the base plate 15 and the end of the blade 17 in its extended position. However, when the attachment means 11 of the present invention is attached to the saber saw 13, the depth of cut D thereof is the distance between the underneath side of the first plate means 33 (when the first plate means 33 is abutted against the end of the bolt members 45) and the end of the blade 17 in its extended position. FIG. 1 shows the attachment means adjusted so that the depth of cut D of the saber saw 13 is relatively deep. FIg. 2 shows the attachment means 11 adjusted so that the depth of cut D of the saber saw 13 is relatively shallow. It should be noted that one or both of the nut members 49, 51 may consist of a wing nut for allowing adjustment of the attachment means 11 to be easily done by hand.

Although the invention has been described and illustrated with respect to a preferred embodiment thereof, it is not to be so limited since changes and modifications may be made therein which are within the full intended scope of the invention.

I claim:

1. An attachment means for controlling the depth of cut of a saber saw of the type including a base plate having an underneath side for normally engaging the material to be cut; said attachment means comprising:
   (a) a first pivot means for being attached to said underneath side of said base plate;
   (b) a first arm means for being attached to said first pivot means and for pivotal movement relative to said base plate, said first arm means having a first end attached to said first pivot means and having a second end;
   (c) a second pivot means for being attached to said underneath side of said base plate at a spaced distance from said first pivot means;
   (d) a second arm means for being attached to said second pivot means and for pivotal movement relative to said base plate, said second arm means having a first end attached to said second pivot means and having a second end;
   (e) a third pivot means for being attached to said second end of said first arm means;
   (f) fourth pivot means for being attached to said second end of said second arm means;
   (g) first plate means for engaging the material to be cut when said attachment means is attached to said saber saw, said first plate means having a first end for being attached to said third pivot means and having a second end for being attached to said fourth pivot means; and
   (h) adjustment means for causing said first plate means to be spaced a variable distance below said underneath side of said base plate and for allowing the depth of cut of said saber saw to be varied.

2. The attachment means of claim 1 in which is included a second plate means; said second plate means having a first end for being attached to said first pivot means and having a second end for being attached to said second pivot means, said second plate means having an aperture therethrough; in which said adjustment means includes a threaded elongated member for extending through said aperture of said second plate means, said elongated member having a first end for contacting said first plate means; and in which said adjustment means includes an adjustment nut member for being screwably attached to said elongated member beneath said second plate means and for contacting said second plate means, movement of said adjustment nut member on said elongated member being effective to vary the distance below said base plate that said first plate means is held.

3. The attachment means of claim 2 in which said adjustment means includes a lock nut member for being screwably attached to said elongated member above said second plate means and for coacting with said adjustment nut member to lock said elongated member to said second plate means.

4. The attachment means of claim 3 in which is included clamp means for removably attaching said first and second pivot means to said underneath side of said base plate.

5. The attachment means of claim 4 in which said clamp means includes an adjustable clamp member for extending about said base plate and said second plate means to clamp said second plate means to said base plate.

* * * * *